United States Patent [19]

Rosen

[11] 4,355,839
[45] Oct. 26, 1982

[54] THEFT DETERENT DEVICE FOR CAR COVERS

[75] Inventor: Jack S. Rosen, Riverside, Calif.

[73] Assignee: Reliable Auto Accessories, Inc., Riverside, Calif.

[21] Appl. No.: 214,518

[22] Filed: Dec. 9, 1980

[51] Int. Cl.³ .............................................. B60J 11/00
[52] U.S. Cl. ................................. 296/136; 160/368 S
[58] Field of Search ................... 296/136, 95 C, 95 S, 296/190; 160/368 S

[56] References Cited

U.S. PATENT DOCUMENTS 2,646,118  7/1953  Berty ............................. 160/368 S
4,221,424  9/1980  Eiserman ........................ 296/190

FOREIGN PATENT DOCUMENTS 674216  11/1963  Canada ............................. 296/136
2740790  3/1979  Fed. Rep. of Germany .... 296/95 C

*Primary Examiner*—Robert R. Song
*Attorney, Agent, or Firm*—Poms, Smith, Lande & Rose

[57] ABSTRACT

A theft deterent device for vehicle covers to resist unauthorized removal of the cover from the vehicle in which the cover material has attached thereto one end of an elongated flexible member of high tensile strength, the free end of said flexible member having an enlargement with a dimension greater than the space between the peripheral edges of a closure member in such a door and the frame or body portion of the vehicle defining the opening for the closure member. The flexible member has a length to extend from the exterior surface of the vehicle through such space into the interior of the vehicle. When the closure member is closed and locked with the flexible member extending from the car cover through the peripheral space into the interior of the vehicle, the enlarged end resists withdrawal of the flexible member through said space and resists removal of the car cover.

1 Claim, 4 Drawing Figures

THEFT DETERENT DEVICE FOR CAR COVERS

BACKGROUND OF THE INVENTION

Covers for vehicles and automobiles to protect the vehicle from weather and dirt and dust are usually fitted to the veicle contours, are made of pliant, weather resistant material, and are usually expensive because of the number of yards of material required. Such vehicle covers are susceptible to theft or unauthorized removal by simply lifting and taking the vehicle cover off the vehicle, folding the cover material into a relatively small package, and carrying the folded car cover package away.

Prior proposed devices for deterring theft of a vehicle cover has generally been expensive and sometimes awkward to use. One exemplary prior proposed device includes passing a cable or chain beneath the vehicle body and securing ends of the cable to metal plates of selected shape positioned and held in pockets sewn in the car cover material and hwaving attachment means for ends of the cable. Passing the cable beneath the vehicle may require kneeling on the ground and may result in dirty hands and dirty clothes. The cable or chain may be cut with bolt cutters. Further, metal attachments do not permit machine washing of the car cover. If part of the cover material surrounding the pockets is cut away to remove the securement plates, the car cover is damaged and must be repaired before use, otherwise the cut away portions of the cover material may identify the cover as a stolen cover.

Other devices have been used to deter car cover thefts. Such other devices include means for associating the car cover with a vehicle burglar alarm system so that when the car cover is moved before disarming the alarm an audible warning sound will result from an attempt to remove the car cover from the vehicle.

SUMMARY OF THE INVENTION

The present invention relates to a simple, effective, theft deterring device for preventing unauthorized removal of a car cover from a vehicle.

More particularly, the present invention relates to a car cover theft deterring device which includes an elongated flexible member of high tensile strength, having one end of the member secured permanently to the cover material. The other free end of the flexible member includes an enlargement means suitably dimensioned to prevent passage of the enlargement means through the space between the peripheral edge of a vehicle closure member, such as the vehicle door, and the jamb or peripheral edge of the opening defined by the vehicle body and framing of the opening. The flexible member is inserted into such space while the closure member is open and has a length to extend from the exterior surface of the vehicle to the interior of the vehicle. When the closure member is closed and locked with the enlargement means within the vehicle, the car cover material is securely held in relation to the vehicle to resist any unauthorized attempt to remove the car cover.

The main object of the present invention therefore is to provide a simple, effective theft deterring device for resisting unauthorized removal of the car cover from a vehicle.

An object of the present invention is to provide a deterent device as described above which is readily adapted to vehicles of different size and construction and which utilizes existing closure members and vehicle body construction without modification thereof.

Another object of the present invention is to provide an antitheft car cover device in which a major portion of the length of the device is unaccessible and to that extent protected.

Another object of the invention is to provide a car cover theft deterent device which is readily installed and readily released.

A further object of the invention is to provide a deterent device for car covers in which the location of the device is not immediately discernible, one or more of such devices being readily employed with the car cover if desired.

Other general objects of the invention are to provide a deterent device for car covers which is simply constructed, easily secured to the car cover material, readily placed in position and released therefrom, readily stored with the car cover material, inexpensive to manufacture, and effective in its resistance to removal of the car cover.

Various other objects and advantages of the present invention will be readily apparent from the following description and drawings in which an exemplary embodiment of the invention is shown.

IN THE DRAWINGS

Figure 1:
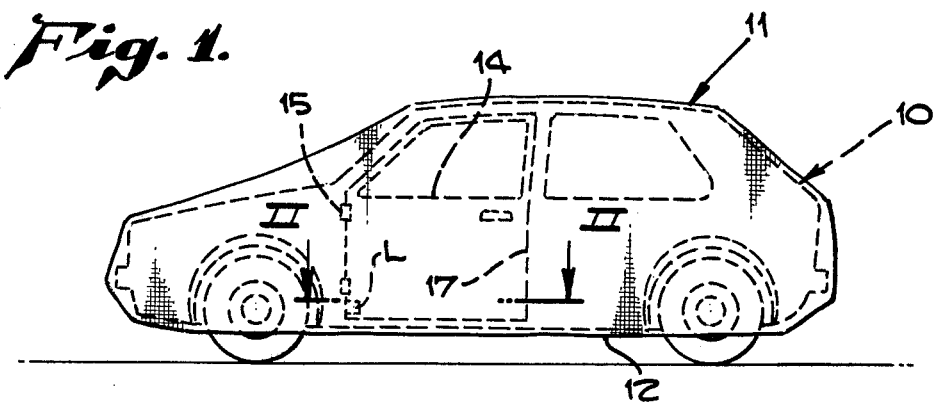
FIG. 1 is a side elevational view of a vehicle with a car cover embodying this invention stretched over the vehicle.

In FIG. 1 a vehicle 10 is illustrated with a car cover 11 placed thereover and usually fitted to conform to the configuration of the vehicle body. The lower peripheral edge 12 of the car cover may be provided with means to draw the bottom edge of the car cover snuggly about the lower portions of the vehicle to prevent removal by winds. Vehicle 10 is illustrated as having a vehicle door 14 suitably hinged at 15 in well-known manner and provided with door lock means 16 in usual manner. Door 14 serves as a closure member for opening 17 provided in the vehicle body for door 14. The edge of opening 17 and the peripheral edge of door 14 usually correspond in shape and configuration and provide a relatively narrow space 18 between the peripheral edges of the door 14 and the opening 17. It is understood that such peripheral space is normally sealed by suitable door gasket means.

Figure 2:
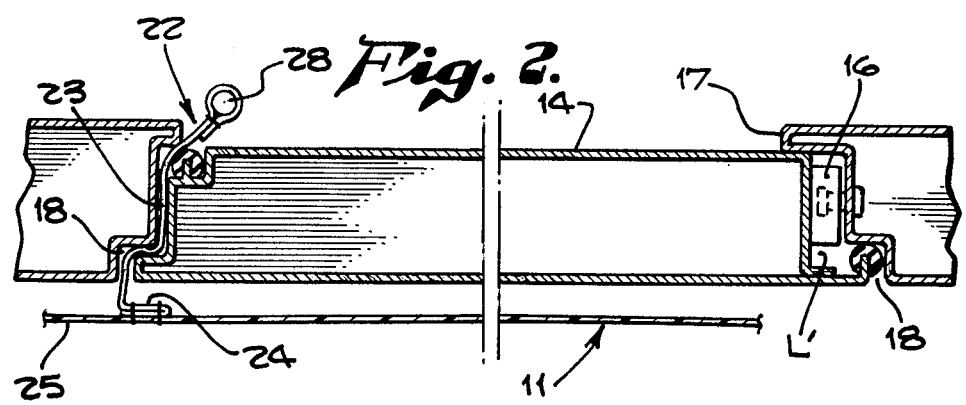
FIG. 2 is an enlarged transverse horizontal fragmentary sectional view taken in the plane indicated by line II—II of FIG. 1.
Figure 4:
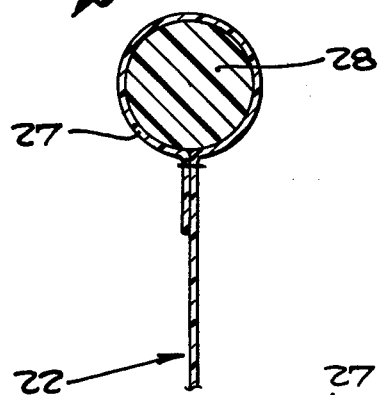
FIG. 4 is a fragmentary sectional view of the enlarged end of the deterent means of this invention.
Figure 3:
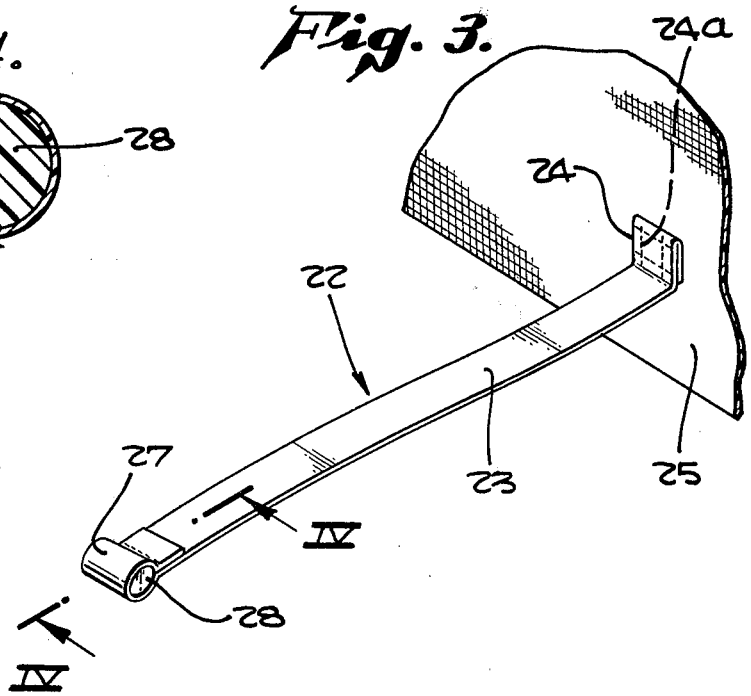
FIG. 3 is an enlarged fragmentary view of a portion of the material of the car cover having one end of the deterent means of this invention secured thereto.

Deterent means generally indicated at 22 to deter unwanted removal of the car cover from the vehicle, for example, theft of the car cover, is best shown in FIGS. 2, 3 and 4. Deterent means 22 includes an elongated flexible member 23 of high tensile strength and preferablby may comprise a strip or band of nylon material. The length of flexible member 23 is sufficient to extend from the exterior face of the vehicle to the interior of the vehicle. One end 24 of member 22 is secured to a portion 25 of the car cover material. The location of portion 25 is adjacent the periphery of door 14 and may be relatively low and at a location adjacent the hinged side of the door as indicated at L. Such location may also be between the vehicle body frame and the door handle side of the door as indicated at L' or at other locations on the door periphery. Stitching 24s may be reinforced with extra stitching to firmly secure end 24 of member 22 to the portion 25 of the car cover material. It will be understood that other means for securing the one end of the member 22 to the car cover material may be used such as riveting or other suitable securing means having sufficient strength to prevent pulling the car material portion 25 away from the end 24 of member 22.

The other free end of flexible member 22 may be formed into a loop 27 having an inner diameter adapted to tightly receive a cylindrical plug 28 having a diameter and length greater than space 18. Cylinder plug 28 may be made of any rigid nondeformable material, such as wood, metal and certain hard rubbers and plastics.

In use, a car cover is placed over the vehicle with the portion 25 adjacent the determined means not drawn to the bottom of the car so that vehicle door may be left partially open to facilitate insertion of the flexible member 22 through the space 18 between the periphery of the car door and the frame of the car opening in order to position the plug 28 inside the car. When the car door is closed and locked, the flexible member will be located in space 18 extending from the outside of the car to the inside of the car. Plug 28 positioned within the car will prevent the car cover from being removed. After the flexible member 22 is properly placed, the car door 14 may be locked and the portion of the car cover which has not been drawn downwardly may then be pulled to its final car cover position.

When a person seeks to remove the car cover without authority and without first opening the car door, it will be apparent that as he uncovers the car and attempts to remove the cover from the car, flexible member 22 with enlarged plug 28 on the inside of the car will deter his removal of the cover since the door in locked position prevents space 18 from enlarging to allow passage of the plug 28 through space 18. It is contemplated that such incomplete removal may be noticed by others and before partial destruction of the car cover.

It will be understood that the deterent means 22 may be readily applied to other locations on a car where a closure member is moved into closed locked position with respect to the closure opening define by a frame or a portion of the vehicle body. For example, other locations of the deterent means may be between the engine hood and the vehicle body, particularly where the engine hood is lockable from inside the car, between the trunk cover and the vehicle body, or between a window edge and the vehicle body. The invention contemplates that one or more deterent means may be used, if desired, so that the car cover may be secured to the vehicle body at one or more places.

Various other changes and modifications may be made in the deterent means described above and all such changes and modifications coming within the scope of the appended claims are embraced thereby.

I claim:

1. Deterent means for unwanted removal of a vehicle cover having cover material with an internal surface extending over the entire vehicle body and below vehicle closure members such as door, windows, hoods, of a vehicle, comprising, in combination:

an elongated thin band of high tensile strength material;

one end of said band being secured to the internal surface of the cover material at a location which will be adjacent to a joint line between a closure member and the vehicle body and immediately nondiscernible at the outer surface of the cover material;

the band having a length adapted to extend between thwe adjacent vehicle closure member and the vehicle body to position the other band end within the vehicle body;

and an enlarged object of rigid nondeformble material secured to said other band end to restrain unwanted separation of the localized areas of the cover material from the vehicle body.

* * * * *